United States Patent [19]

Merz et al.

[11] Patent Number: 4,820,582

[45] Date of Patent: Apr. 11, 1989

[54] WATERPROOF PHOTOGRAPHIC PAPER SUPPORT

[75] Inventors: Heinz-Otto Merz, Bramsche; Alois-Bernhard Kerkhoff, Bissendorf; Wolfgang Storbeck, Belm, all of Fed. Rep. of Germany

[73] Assignee: Felix Schoeller, Jr. GmbH & Co. KG, Osnabruck, Fed. Rep. of Germany

[21] Appl. No.: 108,746

[22] Filed: Oct. 15, 1987

[30] Foreign Application Priority Data

Oct. 29, 1986 [DE] Fed. Rep. of Germany ....... 3636790

[51] Int. Cl.[4] ........................ B32B 23/08; D21H 3/02; D21H 5/00; G03C 1/87

[52] U.S. Cl. ................................ 428/328; 428/478.8; 428/513; 428/414; 430/532; 430/536; 430/538; 162/135

[58] Field of Search ...................... 428/328, 478.8, 513

[56] References Cited

U.S. PATENT DOCUMENTS

| | | | |
|---|---|---|---|
| 4,331,508 | 5/1982 | Miyama et al. | 428/513 X |
| 4,675,245 | 6/1987 | Von Meer | 428/513 X |

*Primary Examiner*—P. C. Ives

*Attorney, Agent, or Firm*—Lockwood, Alex, Fitzgibbon & Cummings

[57] ABSTRACT

A waterproof, polyolefin coated paper support for photographic coatings is disclosed, wherein the paper base contains an alkylketene dimer as a hydrophobizing sizing agent. The alkylketene dimer consists to the greater part of behenyl ketene and contains no more than 40% residues originating from alkylketenes having chains shorter than $C_{20}$-alkyl.

46 Claims, No Drawings

WATERPROOF PHOTOGRAPHIC PAPER SUPPORT

DESCRIPTION

This invention relates to a waterproof coated paper support for photographic coatings.

It is well known to use paper coated on both sides with hydrophobic resin as a waterproof support material for photographic coatings. Such support material basically consists of a sized base paper both sides of which have been coated with resin which is preferably a polyolefin or polyolefin composition and which is applied by means of an extrusion coating procedure.

The two sides of paper coated with polyolefin are protected against the penetration of water and aqueous processing solutions for photographic materials. However, the open edges of such laminates enable aqueous solutions to penetrate the base paper as the cellulose fibers of the paper core, which by nature are hydrophilic, remain untreated. Therefore, as a rule, base papers to be coated with synthetic resins are internally sized with extremely strong hydrophobizing agents in order to reduce the edge penetration of photographic processing solutions as far as possible.

Alkylketene dimers are well-known sizing agents for photographic base paper which hydrophobize the paper to a high degree. These dimerized alkylketenes are used generally in neutral pH-value range together with cationic retention agents or strengthening resins and react at least partially with surface OH-groups of cellulose fibers. (J. Appl. Photographic Engineering 3 (1981), issue No. 7, page 68/69).

Furthermore it is also possible to apply alkylketene dimers in combination with fatty acid soaps or fatty acid anhydrides which are precipitated and fixed to the fibers with aluminium salts in order to achieve the best possible sizing effect.

According to common opinion, the hydrophobizing effect of the alkylketene dimers is caused substantially by the alkyl groups. In practice alkylketene dimers of differing lengths of alkyl chains are used ("mixed" alkylketene dimers). The alkyl residues therein contain between 12 and 18 carbon atoms as can be seen from Research Disclosure, November 1978, report 17516. Alkylketene dimers of between 16 and 18 carbon atoms alkyl residues are most commonly used.

As can be further seen in U.K. Patent GB No. 2,115,314 B a "mixed" alkylketene dimer containing mostly $C_{16}$- and $C_{18}$- alkyl residues as well as smaller quantities of $C_{20}$ and more is the most suitable, whereas residues containing $C_{14}$ or $C_{12}$ are less suitable to achieve good hydrophobizing of the base paper.

The above-mentioned patent claims the use of alkylketene dimers having alkyl chain mixtures as defined by the following equation $$\frac{\frac{1}{3}[C_{16}] + [C_{18}] + 10\,[C_{20}\text{ and more}]}{[C_{14}\text{ and less}]} \geqq 1.$$

According to this claim the value of the equation, referred to as "A-value" is to be equal to or greater than 1. The examples given in the patent, which prove the equation, relate to A-values of between 1.06 and 14.3 for a good sizing effect, whereas A-values under 1 are less suitable (A=0.27; 0.54 and 0.82).

The sizing effect is defined by the edge penetration depth of a photographic developing solution. According to table 11 on page 9 of GB No. 2,115,314, edge penetration depth decreases as A-values increase in the form of a hyperbola. The hyperbolic point of inflection corresponds to A-values of approxiamtely 1. An edge penetration depth of 0.2 mm was achieved with an A-value of 14.3.

In spite of numerous attempts it was not only found to be extraordinarily difficult to reproduce the results published in GB 2,115,314 B, but also impossible to achieve the hyperbolic shape of the rising effect curve. Edge penetration depths, especially as published in table II of the above-mentioned patent, of 0.2 mm, 0.25 mm, and 0.32 mm could not be achieved. When testing under the published manufacturing conditions for the paper, there was not a single case where an edge penetration depth of less than 0.4 mm was attained. This however, is not an unusual occurrence in paper manufacture as, with certainty, different manufacturing locations will mean differing technical equipment and therefore, identical manufacturing conditions cannot be realized.

Although alkylketene dimers, either alone or in combination with other sizing agents, have found widespread popularity in the manufacture of photographic base papers to be coated with synthetic resins, they have, nevertheless, inherent disadvantages which until now have appeared insurmountable. This applies to all alkylketene dimers used for photographic papers to date.

One disadvantage is that alkylketene dimers react only partially when running through a paper-making machine. In practice only a small amount reacts with the OH-groups of the cellulose fibers. The greater part of alkylketene dimers suspended in the pulp to improve sizing effect does not react chemically, but binds only physically to the fiber surfaces and, as a result, does not develop its full hydrophobizing effect. This physically bound proportion consists, partially, of ketone and to a smaller degree, of unreacted alkylketene dimer (see "Wochenblatt fur Papierfabrikation" 1983, page 215 f). To compensate this low degree of chemical reaction paper manufacturers use a proportion of alkylketene dimer of 0.5 to 0.7 percent by weight related to cellulose fibers, to produce photographic base paper. This quantity is markedly higher than the amount theoretically necessary to hydrophobize the fibers if the reaction with OH-groups, as described in the literature, would in fact be quicker and more complete.

Furthermore, it is also disadvantageous that because of the large proportion of physically bound alkylketene dimer in the paper the hydrogen bond between the cellulose fibers (fiber-fiber) is disturbed and, as a result, both the internal strength and the stiffness of the paper are reduced.

The final disadvantage is that the alkylketene dimer which has not reacted during the papermaking procedure tends to migrate, after even a short storage period, to the surface of the paper and collects on the paper surface thereby causing disturbances when the paper is to receive later coatings (e.g. polyolefin). These alkylketene dimer collections (hereinafter referred to as "dusting") can be so bad that during extrusion coating with polyolefin, alkylketene dimer is deposited on the rollers, cylinders and drums of the machine. This results in parts of the machine which come into contact with the base paper having to be cleaned several times daily. Not only is this a cost factor, but also a quality problem.

This can be seen for example in the extremely uneven and reduced bonding of extruded resins on the base paper containing alkylketene dimer, or in that the ketene dimer is deposited on the surface of synthetic resin coats and causes unsatisfactory wetting during the later application of the photographic coatings. All the disadvantages described above appeared on all the papers, with only little alteration, which had been sized according to the GB No. 2,115,314 B, table II composition of alkyl chains for alkylketene dimers.

The object of this invention therefore, is to produce a photographic paper support whose base paper is sized using an alkylketene dimer and which does not show any of the inherent disadvantages described above. A particular object of this invention is to produce base paper using an alkylketene dimer sizing agent for later coating with synthetic resins, in which no harmful dusting of alkylketene dimer appears on the surfaces which would cause disadvantageous effects during the following extrusion coating of the paper with polyolefin.

This object is achieved by sizing the base paper with an alkylketene dimer which is constituted to the greater part of behenyl ketene and contains no more than 40% alkyl residues originating from alkylketenes having chains shorter than $C_{20}$-alkyl.

In a preferred embodiment of the invention the base paper is internally sized by using an alkylketene dimer in which 60% or more of the alkyl residues are alkyl chains having 20 carbon atoms.

In a more preferred embodiment of the invention an alkylketene dimer sizing agent is used in which at least 80% of the alkyl residues are alkyl chains having 20 carbon atoms.

Alkylketene dimer in acccordance with the invention additionally may have minor portions of alkyl chains having more than 20 carbon atoms.

Papers manufactured according to the invention using a behenyl ketene dimer as described above, did not show the disadvantages mentioned in the description of the state of technology. These papers did not show either a dusting of alkylketene dimer or above average problems during the following applications with polyolefin or photographic coatings. Above all there were no adhesion or wetting problems as a result of the alkylketene dimer being transferred to the surface of the polyolefin coat.

These papers showed excellent sizing effects, which means less edge penetration by photographic developing solutions, when even smaller amounts of behenyl ketene dimer were added as usual.

This result is surprising. It is even more surprising that in spite of the alkyl chains being of a greater lengths than the usual alkylketene dimers with alkyl chains of between $C_{12}$ and $C_{20}$, the reactivity of these alkylketene dimers is higher, contrary to general rules. Furthermore no free alkylketene dimer was found in papers manufactured according to the invention, whereas papers produced mostly with alkyl residues of $C_{14}$, $C_{16}$ or $C_{18}$ under the same production conditions all contained free alkylketene dimer. This was the case even when using a pure stearyl ketene dimer with a stearyl ketene content of 98% which, according to the above-mentioned patent, would have been characterized by an A-value of approximately 34.

The alkylketene dimer, substantially containing behenyl ketene, is added for cellulose fiber suspension in the form of an aqueous emulsion. The amount to be added related to the cellulose fibers has a percent weight of between 0.1 and 1.0 in the product according to the invention.

In the variation preferred, the alkylketene dimer containing at least 60% of $C_{20}$-alkyl chains is applied in amounts of between 0.2 and 0.7% by weight related to the cellulose fibers.

The base paper may contain the usual cationic resins such as polyamide-epichlorohydrin resin, polyacrylamide or starch derivatives, as well as the alkylketene dimer, according to the invention. It can also contain combinations of anionic and cationic resins, as described for example in German patent application Nos. DOS 3,328,463, DOS 3,210,621 or DOS 3,216,840, and also additionally other sizing agents such as the soaps of higher fatty acid amides. Additionally, photographic base paper may contain such common additives as pigments, filling materials, coloring agents and optical brighteners in the usual quantities.

The finished base paper, normally surface sized, is treated in the usual manner with a synthetic resin (i.e. polyolefin) on both sides, by an extrusion coating procedure and used as support material for photographic coatings.

The percentages mentioned refer to the number of alkyl residues.

This invention is more completely described in the following examples:

EXAMPLE 1

A bleached short fibered pulp (bleached hardwood kraft pulp) with a consistency of 4% was beaten to 35 SR and was mixed with quantities (see table 1 under example 1) of alkylketene dimer according to the invention containing 87% $C_{20}$-alkyl residues and 1% by weight of polyamide-polyamine-epichlorohydrin resin (i.e. Kymene 557 from Hercules & Co.). This material was run in the normal way on a paper machine to manufacture raw photo paper of a basic weight of 175 g per $m^2$ during which a size press was used for surface treatment using an aqueous mixture containing:

| | |
|---|---|
| oxidized starch | 5% weight |
| sodium chloride (NaCl) | 2.5% weight |
| optical brightener (stilbene derivative) | 0.017% weight |

The coat of the surface sizing amounted to 1.5 g per $m^2$ and side of the dry sheet.

A proportion of this base paper was then extrusion coated (as described in example 4 of U.S. Pat. No. 3,833,380) on both sides with polyethylene at 30 g per $m^2$ and side.

EXAMPLE 2

A short fibered pulp, as in example 1, was sized using the quantities mentioned in table 1 under example 2 of alkylketene dimer according to the invention with 87% $C_{20}$-alkyl residues and 1% by weight of polyamide-polyamine-epichlorohydrin resin, as well as sodium stearate and adjusted by aluminium sulfate to a pH-value of 4.5. The base paper was treated in the usual way in a paper machine and surface sizing took place as in example 1.

A proportion of the paper (175 g per $m^2$) was coated with polyethylene as in example 1.

COMPARATIVE EXAMPLE 1V

A paper was produced according to the conditions in example 1, whose alkylketene dimer was based on a commercial product (Aquapel 101C from Hercules & Co.) with a base of palmitic/stearic acid.

The quantities of alkylketene dimer added can be seen in table 1 under comparison 1.1V to 1.4V.

COMPARATIVE EXAMPLE 2V

A paper was produced according to the conditions described under example 2 whose alkylketene dimer, however, was based on a commercial product (Aquapel 101C from Hercules & Co.) with a base of palmitic/stearic acid.

The quantities of alkylketene dimer added can be seen in table 1 under comparison 2.1V to 2.3V.

COMPARATIVE EXAMPLE 3V

A paper was produced according to the conditions described under example 1 whose alkylketene dimer, however, was a product based on pure stearic acid (98% stearic acid proportion).

The quantities of alkylketene dimer added can be seen in table 1 under comparison 3.1V and 3.2V.

TABLE 1

| | Percent Weight of Dry Substance Related to Cellulose Fibers. | | |
|---|---|---|---|
| | Alkylketene dimer | Sodium stearate | Aluminium sulfate |
| Examples 1.1 | 0.1 | — | — |
| 1.2 | 0.3 | — | — |
| 1.3 | 0.5 | — | — |
| 1.4 | 0.75 | — | — |
| 1.5 | 1.0 | — | — |
| 1.6 | 2.0 | — | — |
| Examples 2.1 | 0.3 | 1.0 | 1.0 |
| 2.2 | 0.5 | 1.0 | 1.0 |
| 2.3 | 0.8 | 1.0 | 1.0 |
| Comparison 1.1 V | 0.3 | — | — |
| 1.2 V | 0.5 | — | — |
| 1.3 V | 0.75 | — | — |
| 1.4 V | 1.0 | — | — |
| Comparison 2.1 V | 0.3 | 1.0 | 1.0 |
| 2.2 V | 0.5 | 1.0 | 1.0 |
| 2.3 V | 0.8 | 1.0 | 1.0 |
| Comparison 3.1 V | 0.5 | — | — |
| 3.2 V | 0.75 | — | — |

EXAMPLE 3

A cellulose fiber mixture (2 parts hardwood pulp/1 part coniferous wood pulp) with a consistency of 4% was beaten to 40° SR. The material was mixed with quantities (see example 3, table 2) of alkylketene dimer according to the invention containing 87% $C_{20}$-alkyl residues and 1% by weight of polyamide-polyamine-epichlorohydrin resin, as well as, in accordance with table 2, epoxidized stearic acid amide and/or cationic and/or anionic polyacrylamide, and was run through a paper making machine in the usual way to become base paper. Surface sizing was carried out with the following aqueous mixture in the size press:

| | |
|---|---|
| Polyvinylalcohol modified with itaconic acid (saponification degree 98%, carboxy group content 2.6 mol %) | 4% weight |
| $CaCl_2$ | 5% weight |

The amount of this solution, after drying, was 1.7 g per $m^2$. Total weight of the base paper was 110 g per $m^2$. A proportion of this base paper was extrusion coated on both sides with polyethylene in the usual way, the amount used being 20 g per $m^2$ per side.

EXAMPLE 4

A cellulose fiber mixture (1 part hardwood pulp/1 part coniferous wood pulp) was sized using a mixture of alkylketene dimer according to the invention (containing 87% $C_{20}$-alkyl residue), 1% by weight of polyamide-polyamine-epichlorohydrin resin, sodium stearate, adjusted by aluminium sulfate to a pH value of 4.5, and additives of epoxidized stearic acid amide and/or anionic—and/or cationic—polyacrylamide. The varying quantities can be seen in table 2 under example 4. Surface sizing, basis weight and polyethylene coating have been selected as in example 3.

COMPARATIVE EXAMPLE 4V

A paper was manufactured according to the conditions described in example 3, whereby the alkylketene dimer was based on a product of palmitic/stearic acid (Aquapel 101 C from Hercules & Co.).

The varying additive quantities are given in table 2 under comparisons 4.1V to 4.3V.

COMPARATIVE EXAMPLE 5V

A paper was manufactured according to the conditions described in example 4, whereby the alkylketene dimer was based on a product of palmitic/stearic acid (Aquapel 101 C from Hercules & Co.).

The varying additive quantities are given in table 2 under comparisons 5.1V to 5.2V.

TABLE 2

| | Additives to Paper Percent Weight of Dry Substance Related to Cellulose Fibers | | | | | |
|---|---|---|---|---|---|---|
| | Alkylketene Dimer | Sodium Stearate | Aluminium Sulfate | Epoxidized Stearic Acid Amide | Anionic Polyacrylic Amide | Cationic Polyacryl Amide |
| Examples 3.1 | 0.8 | — | — | 0.1 | — | — |
| 3.2 | 0.8 | — | — | — | 0.8 | — |
| 3.3 | 0.8 | — | — | — | — | 0.5 |
| 3.4 | 0.8 | — | — | — | 0.5 | 0.3 |
| 3.5 | 0.8 | — | — | 0.1 | 0.5 | 0.3 |
| Examples 4.1 | 0.8 | 1.0 | 1.0 | — | 0.8 | — |
| 4.2 | 0.8 | 1.0 | 1.0 | 0.1 | 0.5 | 0.3 |
| 4.3 | 0.4 | 1.0 | 1.0 | 0.1 | 0.5 | 0.3 |
| Comparison 4.1 V | 0.8 | — | — | 0.1 | — | — |
| 4.2 V | 0.4 | — | — | 0.1 | — | — |
| 4.3 V | 0.8 | — | — | — | 0.5 | 0.3 |
| Comparison 5.1 V | 0.8 | 1.0 | 1.0 | — | 0.8 | — |

TABLE 2-continued

| | Additives to Paper Percent Weight of Dry Substance Related to Cellulose Fibers | | | | | |
|---|---|---|---|---|---|---|
| | Alkylketene Dimer | Sodium Stearate | Aluminium Sulfate | Epoxidized Stearic Acid Amide | Anionic Polyacrylic Amide | Cationic Polyacryl Amide |
| 5.2 V | 0.4 | 1.0 | 1.0 | 0.1 | 0.5 | 0.3 |

EXAMPLE 5

A short fibered cellulose pulp (bleached hardwood kraft pulp) was beaten with a consistency of 4% to 30 SR. The material was sized using alkylketene dimer according to the invention (87% $C_{20}$-alkyl residues), 1% weight of polyamide-polyamine-epichlorohydrin resin, as well as starch and further auxiliary materials as shown in table 3, example 5. A solution as in example 1 was put into the size press of the paper machine and the paper was surface sized using a quantity of 1.5 g per m$^2$ per side, dry substance. Base paper weight amounted to 75 g per m$^2$. A proportion of this paper was extrusion coated using a quantity of 20 g per m$^2$ polyethylene per side.

TABLE 3

| | Additives to Paper Percent Weight of Dry Substance Related to Cellulose Fibers | | | | | | |
|---|---|---|---|---|---|---|---|
| | Alkylketene Dimer | Anionic Starch | Cationic Starch | Aluminium Sulfate | Sodium Stearate | Anionic Polyacryl Amide | Epoxidized Behenyl Acid Amide |
| Examples 5.1 | 0.8 | 1.0 | — | — | — | — | — |
| 5.2 | 0.4 | 1.0 | — | 1.0 | 1.0 | — | — |
| 5.3 | 0.4 | — | 1.0 | — | — | — | — |
| 5.4 | 0.8 | — | 1.0 | — | — | — | — |
| 5.5 | 0.8 | 1.0 | — | — | — | 0.5 | 0.1 |
| Comparison 6.1 V | 0.4 | 1.0 | — | 1.0 | 1.0 | — | — |
| 6.2 V | 0.8 | 1.0 | — | — | — | 0.5 | 0.1 |
| 6.3 V | 0.8 | — | 1.0 | — | — | — | — |

EXAMPLE 6

A base paper was manufactured according to example 1. The alkylketene dimers used differed in their $C_{20}$-alkyl residue content as follows:

| | alkylketene dimer content (% by weight) | $C_{20}$-proportion |
|---|---|---|
| 6.1 | 0.3 | 60% |
| 6.2 | 0.8 | 60% |
| 6.3 | 0.6 | 65% |
| 6.4 | 0.6 | 75% |

COMPARATIVE EXAMPLE 6V

A paper was manufactured according to the conditions described in example 5, whereby the alkylketene dimer was based on a product of palmitic/stearic acid (Aquapel 101 C from Hercules & Co.).

The additive quantities are given in table 3 under comparisions 6.1V to 6.3V.

COMPARATIVE EXAMPLE 7V (according to GB No. 2,115,314)

A cellulose mixture (2 parts hardwood pulp/1 part coniferous wood pulp) was beaten with a consistency of 4% to 43° SR. The material was sized with 0.7% weight of alkylketene dimers and 0.7% weight of polyamide-polyamine-epichlorohydrin resin on a paper machine in whose size press the same solutions and quantities as in example 1 were used as coating material. A proportion of the base paper was extrusion coated on both sides using 30 g per m$^2$ per side of polyethylene. A alkyl chain content of the applied alkylketene dimers were as follows:

| Comparison | Composition of the Alkyl Chains: $C_{14}$ and less | $C_{16}$ | $C_{18}$ | $C_{20}$ and more |
|---|---|---|---|---|
| 7.1 V | 55 | 20 | 2 | 23 |
| 7.2 V | 36 | 10 | 3 | 51 |

The following processes were used in the examination of the paper:

DUSTING EXAMINATION

Samples of the raw paper were stored for 7 days at a constant temperature of 35° C. and a constant relative humidity of 50%. Thereafter, the quantities of diketene dust on the paper surface were judged visually when the paper was illuminated by a beam of light projected across the surface. The following grading system was used:

| degree of dusting |
|---|
| 0 = none |
| + = little |
| ++ = moderate |
| +++ = heavy |

BOND STRENGTH

The internal strength of the base paper was measured with an Internal Bond Impact Tester Model B according to TAPPI RC 308.

FLEXURAL RESISTANCE

The flexural resistance values of the base paper were measured using a flexural resistance tester from the firm of Lorentzen & Wettre, Stockholm, according to the norm SCAN-P 29.69 and were recalculated to give specific stiffness.

EDGE PENETRATION OF DEVELOPING SOLUTION

The polyethylene coated paper was cut to the necessary examining dimensions and placed in a commercial color developer bath at 30° C. for 25 minutes. It was then rinsed, placed in a commercial fixing bath, rerinsed and dried. Thereafter the edge penetration depth of the developing fluid was measured in mm using a magnifying glass.

POLYETHYLENE ADHESION

The surface of the coated paper was slit using a razor blade so that the polyethylene coating could be stripped off in 25 mm wide pieces. The striping power required was measured on a tensile strength tester (model Alwetron TH 1 from Lorentzen & Wettre, Stockholm).

All the test results can be seen in tables 4 and 5.

TABLE 4

Test Results of the Examples of the Invention

| Examples | Dusting | Scott Bond | Specific Stiffness $mN(10^{-2}\ \mu m^{-2.8})$ | Edge Penetration (mm) | Polyethylene Adhesion (N/15 mm) |
|---|---|---|---|---|---|
| 1.1 | 0 | 170 | 57 | 1.30 | 1.4 |
| 1.2 | 0 | 135 | 55 | 0.71 | 1.3 |
| 1.3 | 0 | 118 | 51 | 0.68 | 1.2 |
| 1.4 | 0 | 99 | 50 | 0.65 | 0.95 |
| 1.5 | 0 | 85 | 47 | 0.61 | 0.8 |
| 1.6 | 0 | 55 | 45 | 0.62 | 0.6 |
| 2.1 | 0 | 75 | 45 | 0.70 | 0.8 |
| 2.2 | 0 | 63 | 44 | 0.69 | 0.6 |
| 2.3 | 0 | 50 | 43 | 0.67 | 0.5 |
| 3.1 | 0 | 92 | 48 | 0.54 | 0.9 |
| 3.2 | 0 | 228 | 62 | 0.54 | 2.5 |
| 3.3 | 0 | 161 | 53 | 0.77 | 1.6 |
| 3.4 | 0 | 207 | 61 | 0.53 | 2.0 |
| 3.5 | 0 | 190 | 58 | 0.45 | 2.0 |
| 4.1 | 0 | 103 | 51 | 0.56 | 1.0 |
| 4.2 | 0 | 101 | 51 | 0.53 | 1.1 |
| 4.3 | 0 | 107 | 53 | 0.53 | 1.2 |
| 5.1 | 0 | 175 | 59 | 0.54 | 1.8 |
| 5.2 | 0 | 91 | 51 | 0.61 | 1.1 |
| 5.3 | 0 | 143 | 56 | 0.68 | 1.4 |
| 5.4 | 0 | 130 | 54 | 0.65 | 1.4 |
| 5.5 | 0 | 260 | 70 | 0.40 | 2.8 |
| 6.1 | 0 | 125 | 53 | 0.68 | 1.3 |
| 6.2 | 0 | 91 | 49 | 0.64 | 0.8 |
| 6.3 | 0 | 109 | 50 | 0.66 | 1.1 |
| 6.4 | 0 | 112 | 51 | 0.64 | 1.2 |

TABLE 5

Test Results of the Comparative Examples

| Examples | Dusting | Scott Bond | Specific Stiffness $mN(10^{-2}\ \mu m^{-2.8})$ | Edge Penetration (mm) | Polyethylene Adhesion (N/15 mm) |
|---|---|---|---|---|---|
| 1.1 V | + | 100 | 50 | 1.20 | 1.1 |
| 1.2 V | ++ | 88 | 48 | 0.71 | 0.9 |
| 1.3 V | +++ | 73 | 47 | 0.66 | 0.7 |
| 1.4 V | +++ | 60 | 43 | 0.65 | 0.6 |
| 2.1 V | + | 58 | 44 | 0.68 | 0.5 |
| 2.2 V | ++ | 49 | 43 | 0.66 | 0.3 |
| 2.3 V | +++ | 46 | 42 | 0.65 | 0.3 |
| 3.1 V | ++ | 85 | 48 | 0.70 | 0.9 |
| 3.2 V | +++ | 75 | 47 | 0.63 | 0.7 |
| 4.1 V | +++ | 66 | 45 | 0.57 | 0.7 |
| 4.2 V | ++ | 84 | 47 | 0.70 | 0.9 |
| 4.3 V | +++ | 182 | 55 | 0.54 | 1.8 |
| 5.1 V | +++ | 74 | 49 | 0.51 | 0.7 |
| 5.2 V | ++ | 87 | 50 | 0.55 | 0.8 |
| 6.1 V | ++ | 83 | 49 | 0.63 | 0.9 |
| 6.2 V | +++ | 232 | 68 | 0.47 | 2.6 |

TABLE 5-continued

Test Results of the Comparative Examples

| Examples | Dusting | Scott Bond | Specific Stiffness $mN(10^{-2}\ \mu m^{-2.8})$ | Edge Penetration (mm) | Polyethylene Adhesion (N/15 mm) |
|---|---|---|---|---|---|
| 6.3 V | +++ | 117 | 52 | 0.66 | 1.3 |
| 7.1 V | ++ | 78 | 48 | 0.63 | 0.7 |
| 7.2 V | ++ | 84 | 50 | 0.61 | 0.8 |

The results prove that base paper sized with behenyl ketene dimers according to the invention show no signs of the dusting of the alkylketene dimers which is so disadvantageous during the further processing of the paper. Papers manufactured according to the invention furthermore have a relatively higher bond strength (Scott Bond) and, generally a higher degree of polyethylene adhesion to the base paper.

It was furthermore shown that upon application of behenyl ketene dimer as a sizing agent, the total additive quantities to the sizing agent could be reduced without any detriment to the edge penetration quantities. As a result, the physical characteristics of the base paper (bond strength and flexural resistance) are still further improved. As far as polyethylene adhesion is concerned, the tests showed constant adhesion values and fibrous breakage on the paper surface and no separation without this. Transference of alkylketene dimer to the resin surface was not observed in any single case.

The base papers manufactured according to the invention are for the purpose of producing waterproof support paper for photographic coatings preferably both sides with polyolefin resin coatings as described in U.S. Pat. Nos. 3,411,908, 3,833,380, and U.S. Pat. No. 4,169,188, GB No. 2,110,116 and in many other publications. The resin coated support paper with or without pre-treatment and further necessary coatings may then be coated in the usual manner with black/white- or color-photographic layers.

We claim:

1. A waterproof paper support for photographic coatings comprising a base paper with a polyolefin coating thereon, wherein said base paper is internally sized with a cationic aqueous dispersion of an alkylketene dimer which is a behenyl ketene containing dimer having a behenyl ketene content of between 60 to 98 mole % and which contains in the dimer less than 40% alkyl residues shorter than $C_{18}$-alkyl.

2. The paper support of claim 1, wherein said alkylketene dimer contains no more than 40% of alkyl residues originating from alkylketenes having chains shorter than $C_{20}$-alkyl.

3. The paper support of claim 1, wherein the alkylketene dimer is based on behenyl ketene and at least 60% of the alkyl residues of the alkylketene dimer are $C_{20}$-alkyl residues.

4. The paper support of claim 2, wherein the alkylketene dimer is based on behenyl ketene and at least 60% of the alkyl residues of the alkylketene dimer are $C_{20}$-alkyl residues.

5. The paper support of claim 1, wherein said base paper includes about 0.1 to 1.0% by fiber weight of alkylketene dimer.

6. The paper support of claim 5, wherein said base paper includes about 0.2 to 0.7% by fiber weight of alkylketene dimer.

7. The paper support of claim 2, wherein said base paper includes about 0.1 to 1.0% by fiber weight of alkylketene dimer.

8. The paper support of claim 7, wherein said base paper includes about 0.2 to 0.7% by fiber weight of alkylketene dimer.

9. The paper support of claim 3, wherein said base paper includes about 0.1 to 1.0% by fiber weight of alkylketene dimer.

10. The paper support of claim 9, wherein said base paper includes about 0.2 to 0.7% by fiber weight of alkylketene dimer.

11. The paper support of claim 4, wherein said base paper includes about 0.1 to 1.0% by fiber weight of alkylketene dimer.

12. The paper support of claim 11, wherein said base paper includes about 0.2 to 0.7% by fiber weight of alkylketene dimer.

13. The paper support of claim 1, wherein said base paper includes about 0.1 to 1.0% by fiber weight of alkylketene dimer, and at least about 80% of the alkyl residues of the alkylketene dimer are $C_{20}$-alkyl residues.

14. The paper support of claim 1, wherein said base paper also contains at least one sizing agent other than said alkylketene dimer.

15. The paper support of claim 14, wherein the other sizing agent is an epoxidized higher fatty acid amide.

16. The paper support of claim 15, wherein said epoxidized higher fatty acid amide is an epoxidized stearic acid amide.

17. The paper support of claim 15, wherein the epoxidized fatty acid amide is an epoxidized behenic acid amide.

18. The paper support of claim 6, including a sizing agent comprising a soap of a higher fatty acid.

19. The paper support of claim 1, wherein said base paper also contains at least one cationic resin.

20. The paper support of claim 19, wherein said cationic resin is a polyamide-polyamine-epichlorohydrin resin.

21. The paper support of claim 19, wherein said cationic resin is a cationic polyacryl amide.

22. The paper support of claim 19, wherein said base paper also contains at least one anionic resin.

23. The paper support of claim 22, wherein said anionic resin is an anionic polyacryl amide or an anionic starch.

24. The paper support of claim 2, wherein said base paper also contains at least one cationic resin.

25. The paper support of claim 24, wherein said cationic resin is a polyamide-polyamine-epichlorohydrin resin.

26. The paper support of claim 24, wherein said cationic resin is a cationic polyacryl amide.

27. The paper support of claim 24, wherein said base paper also contains at least one anionic resin.

28. The paper support of claim 27, wherein said anionic resin is an anionic polyacryl amide or an anionic starch.

29. The paper support of claim 3, wherein said base paper also contains at least one cationic resin.

30. The paper support of claim 29, wherein said cationic resin is a polyamide-polyamine-epichlorohydrin resin.

31. The paper support of claim 29, wherein said cationic resin is a cationic polyacryl amide.

32. The paper support of claim 29, wherein said base paper also contains at least one anionic resin.

33. The paper support of claim 32, wherein said anionic resin is an anionic polyacryl amide or an anionic starch.

34. The paper support of claim 13, wherein said base paper also contains at least one cationic resin.

35. The paper support of claim 34, wherein said cationic resin is a polyamide-polyamine-epichlorohydrin resin.

36. The paper support of claim 34, wherein said cationic resin is a cationic polyacryl amide.

37. The paper support of claim 34, wherein said base paper also contains at least one anionic resin.

38. The paper support of claim 37, wherein said anionic resin is an anionic polyacryl amide or an anionic starch.

39. The paper support of claim 1, wherein said base paper also contains an aluminium salt.

40. The paper support of claim 2, wherein said base paper also contains an aluminium salt.

41. The paper support of claim 3, wherein said base paper also contains an aluminium salt.

42. The paper support of claim 5, wherein said base paper also contains an aluminium salt.

43. The paper support of claim 13, wherein said base paper also contains an aluminium salt.

44. The paper support of claim 18, wherein said base paper also contains an aluminium salt.

45. The paper support of claim 19, wherein said base paper also contains an aluminium salt.

46. The paper support of claim 22, wherein said base paper also contains an aluminium salt.

* * * * *